United States Patent
Park et al.

(10) Patent No.: US 9,634,309 B2
(45) Date of Patent: Apr. 25, 2017

(54) BINDER COMPOSITION, SEPARATOR INCLUDING BINDER FORMED FROM THE BINDER COMPOSITION, LITHIUM BATTERY INCLUDING THE SEPARATOR, AND METHOD OF PREPARING THE BINDER COMPOSITION

(71) Applicant: SAMSUNG SDI CO., LTD., Yongin-si, Gyeonggi-do (KR)

(72) Inventors: June Park, Suwon-si (KR); Takahiro Endo, Suwon-si (KR); Jung-Hyun Nam, Suwon-si (KR); Jong-Hwan Park, Suwon-si (KR); Iwao Fukuchi, Suwon-si (KR)

(73) Assignee: SAMSUNG SDI CO., LTD., Yongin-Si, Gyeonggi-Do (KR)

( * ) Notice: Subject to any disclaimer, the term of this patent is extended or adjusted under 35 U.S.C. 154(b) by 271 days.

(21) Appl. No.: 14/516,004

(22) Filed: Oct. 16, 2014

(65) Prior Publication Data

US 2015/0155539 A1 Jun. 4, 2015

(30) Foreign Application Priority Data

Dec. 2, 2013 (KR) ........................ 10-2013-0148784

(51) Int. Cl.
    *H01M 2/16* (2006.01)
    *C08F 259/08* (2006.01)
    *H01M 10/052* (2010.01)

(52) U.S. Cl.
    CPC ........... *H01M 2/166* (2013.01); *C08F 259/08* (2013.01); *H01M 2/1686* (2013.01); *H01M 10/052* (2013.01)

(58) Field of Classification Search
    CPC .. H01M 2/166; H01M 2/1686; H01M 10/052; Y02T 10/7011; C08F 220/06; C08F 259/08
    See application file for complete search history.

(56) References Cited

U.S. PATENT DOCUMENTS

2006/0058462 A1   3/2006   Kim et al.
2007/0244262 A1   10/2007  Zhang et al.
(Continued)

FOREIGN PATENT DOCUMENTS

JP     4849286 B1       10/2011
KR   2003-0032025 A      4/2003
(Continued)

OTHER PUBLICATIONS

Sheng Shut Zhang, "A review on the separators of liquid electrolyte Li-ion batteries", Journal of Power Sources 164, (2007), pp. 351-364.

(Continued)

*Primary Examiner* — Brittany Raymond
(74) *Attorney, Agent, or Firm* — Lee & Morse, P.C.

(57) ABSTRACT

A separator for a battery, a battery, and a method of preparing a graft copolymer for a binder, the separator including a porous substrate; a coating layer on at least one surface of the porous substrate, the coating layer including an inorganic oxide; and a binder between the porous substrate and the inorganic oxide or between adjacent particles of the inorganic oxide, the binder including a graft copolymer, wherein the graft copolymer has a backbone of a polyvinylidene fluoride-based polymer or a polyvinylidene fluoride-based copolymer, and a pendant chain grafted to the backbone, the pendant chain including a hydrophilic repeating unit, and fluorine atoms in the backbone of the graft copolymer are partially substituted with at least one of chlorine, bromine, or iodine.

13 Claims, 8 Drawing Sheets

(56) References Cited

U.S. PATENT DOCUMENTS

2009/0111026 A1    4/2009   Kim et al.
2011/0168630 A1    7/2011   Mayes et al.
2012/0309892 A1   12/2012   Ootsuka et al.

FOREIGN PATENT DOCUMENTS

| KR | 10-2004-0078927 A | 9/2004 |
| KR | 0727248 B2 | 6/2007 |
| KR | 10-2012-0006667 A | 1/2012 |
| KR | 10-2013-0005875 A | 1/2013 |
| KR | 10-2013-0007740 A | 1/2013 |

OTHER PUBLICATIONS

Korean Office action dated Jan. 11, 2017 for KR 10-2013-148784.
June Park, et al.

BINDER COMPOSITION, SEPARATOR INCLUDING BINDER FORMED FROM THE BINDER COMPOSITION, LITHIUM BATTERY INCLUDING THE SEPARATOR, AND METHOD OF PREPARING THE BINDER COMPOSITION

CROSS-REFERENCE TO RELATED APPLICATION

Korean Patent Application No. 10-2013-0148784, filed on Dec. 2, 2013, in the Korean Intellectual Property Office, and entitled: "Binder Composition, Separator Including Binder Formed From The Binder Composition, Lithium Battery Including The Separator, and Method Of Preparing The Binder Composition," is incorporated by reference herein in its entirety.

BACKGROUND

1. Field

Embodiments relate to a binder composition, a separator including a binder formed from the binder composition, a lithium battery including the separator, and a method of preparing the binder composition.

2. Description of the Related Art

Along with an increasing demand for secondary batteries for use in portable electronic devices for information communications, e.g., personal digital assistants (PDAs), mobile phones, and laptop computers, or electric bicycles, electric vehicles, and the like, there lithium batteries, e.g., lithium ion secondary batteries with durability against high voltage, long lifetime and high energy density have been considered. As a result, a variety of lithium batteries may be available.

SUMMARY

Embodiments are directed to a binder composition, a separator including a binder formed from the binder composition, a lithium battery including the separator, and a method of preparing the binder composition.

The embodiments may be realized by providing a separator for a battery, the separator including a porous substrate; a coating layer on at least one surface of the porous substrate, the coating layer including an inorganic oxide; and a binder between the porous substrate and the inorganic oxide or between adjacent particles of the inorganic oxide, the binder including a graft copolymer, wherein the graft copolymer has a backbone of a polyvinylidene fluoride-based polymer or a polyvinylidene fluoride-based copolymer, and a pendant chain grafted to the backbone, the pendant chain including a hydrophilic repeating unit, and fluorine atoms in the backbone of the graft copolymer are partially substituted with at least one of chlorine, bromine, or iodine.

An amount of the fluorine atoms partially substituted with the at least one of chlorine, bromine, or iodine may be about 1 wt % to about 10 wt %, based on a total weight of fluorine atoms in the backbone.

The backbone may include polyvinylidene fluoride-co-chlorotrifluoroethylene or polyvinylidene fluoride-co-chlorotrifluoroethylene/polyvinylidene fluoride-co-hexafluoropropylene.

The pendant chain may have a weight average molecular weight of from about 100 g/mol to about 1,000,000 g/mol.

The pendant chain may include a carboxyl group in the hydrophilic repeating unit.

The hydrophilic repeating unit may be derived from a vinyl-based monomer.

The vinyl-based monomer may include at least one of acrylic acid, butyl acrylate, triethylene glycol acrylate, acrylonitrile, acrylamide, 2-hydroxyethyl acrylate, maleic anhydride, ethylene glycol vinyl ether, or itaconic acid.

The graft copolymer may be included in the binder in an amount of about 0.1 wt % to about 100 wt %, based on a total weight of the binder.

The inorganic oxide may include at least one selected from $\alpha\text{-}Al_2O_3$, $\gamma\text{-}Al(O)OH$, $TiO_2$, $ZrO_2$, and $SiO_2$.

The binder may be included in the separator in an amount of about 1 wt % to about 50 wt %, based on a total weight of the inorganic oxide.

The porous substrate may be a polyolefin-based porous substrate.

The binder may have an adhesive strength of about 40 mN/mm or greater with respect to the porous substrate.

The embodiments may be realized by providing a battery including a cathode; an anode; and a separator between the cathode and the anode, the separator being the separator according to an embodiment.

The embodiments may be realized by providing a method of preparing a graft copolymer for a binder, the method including performing a catalyzed radicalization of a moiety of a polyvinylidene-based polymer or copolymer, for forming a backbone, and in which fluorine atoms have been partially substituted with at least one of chlorine, bromine, or iodine; and graft polymerizing the radicalized moiety of the backbone and a carbon-carbon double bond into a pendant chain having a hydrophilic repeating unit to form the graft copolymer.

A catalyst of the catalyzed radicalization may include a ligand and a metal halide.

The ligand may include bipyridine, and the metal halide may include at least one of Cu(I)Cl or Cu(II)Cl$_2$.

The polyvinylidene-based copolymer for forming the backbone may include a polyvinylidene fluoride-co-chlorotrifluoroethylene-based copolymer or polyvinylidene fluoride-co-chlorotrifluoroethylene/polyvinylidene fluoride-co-hexafluoropropylene-based copolymer.

The hydrophilic repeating unit may be derived from a vinyl-based monomer.

An amount of the fluorine atoms that have been partially substituted with at least one of chlorine, bromine, or iodine remaining in the graft copolymer after graft polymerizing may be about 1 wt % to about 10 wt %, based on a total weight of the fluorine atoms in the backbone.

The graft polymerization may include an atom transfer radical polymerization.

BRIEF DESCRIPTION OF THE DRAWINGS

Features will be apparent to those of skill in the art by describing in detail exemplary embodiments with reference to the attached drawings in which.

DETAILED DESCRIPTION

Figure 1:
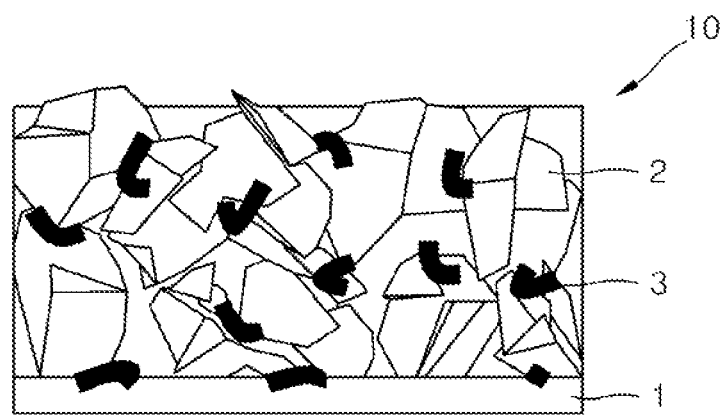
FIG. 1 illustrates a schematic view of a separator according to an embodiment.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art.

In the drawing figures, the dimensions of layers and regions may be exaggerated for clarity of illustration. It will also be understood that when a layer or element is referred to as being "on" another element, it can be directly on the other element, or intervening elements may also be present. In addition, it will also be understood that when a layer is referred to as being "between" two elements, it can be the only element between the two elements, or one or more intervening elements may also be present. Like reference numerals refer to like elements throughout.

Hereinafter, a binder composition, a separator including a binder formed from the binder composition, a lithium battery including the separator, and a method of preparing the binder composition according to embodiments will be described in greater detail.

According to an embodiment, a binder composition may include a graft copolymer. The graft copolymer may have a backbone that is derived from a polyvinylidene fluoride (PVdF)-based polymer or copolymer in which fluorine atoms are at least partially substituted with at least one element of chlorine (Cl), bromine (Br), or iodine (I). A pendant chain may be grafted on the backbone, the pendant chain including a hydrophilic repeating unit.

A polyvinylidene fluoride-based polymer may provide insufficient adhesion as a binder when used in a small amount, or may not form a coating layer durable against impregnation of electrolyte or migration of lithium ions during charging and discharging of a lithium battery. A 2-phase structured binder having a chemical structure with strong adhesion to a porous substrate, a binder using a silane coupling agent, and interpenetrating polymer network (IPN) binder including a polyvinylidene fluoride-based polymer and a hydrophilic polymer (such as unsaturated carbonic acid ester) may provide satisfactory adhesion to either a porous substrate or an adjacent particles of the inorganic oxide, but not both of them.

In an implementation, the binder composition may have both hydrophilic properties and hydrophobic properties to help improve adhesion to both a porous substrate and adjacent particles of the inorganic oxide. A lithium battery including a separator that includes a binder formed from the binder composition with the improved adhesion may have improved lifetime characteristics.

An amount of the fluorine atom that is partially substituted with at least one of Cl, Br, and I may be about 1 wt % to about 10 wt %, based on a total weight of the fluorine atoms in the backbone. For example, an amount of the fluorine atom that is partially substituted with at least one of Cl, Br, and I and remains in the backbone of the graft copolymer of the binder composition may be about 1 wt % to about 10 wt %, based on a total weight of the fluorine atoms in the backbone. In an implementation, the amount of the fluorine atom partially substituted with at least one of Cl, Br, and I may be, e.g., about 1 wt % to about 9 wt %, or about 1 wt % to about 8 wt %, based on a total weight of the fluorine atoms in the backbone. When the amount of the fluorine atom partially substituted with at least one of Cl, Br, and I is within these ranges, the binder composition may have appropriate hydrophilic properties for improving adhesion to the porous substrate and particles of the inorganic oxide.

In an implementation, the backbone of the graft copolymer in the binder composition may be derived from polyvinylidene fluoride-co-chlorotrifluoroethylene (PVdF-co-CTFE) or polyvinylidene fluoride-co-chlorotrifluoroethylene/polyvinylidene fluoride-co-hexafluoropropylene (PVdF-co-CTFE/PVdF-co-HFP). For example, the backbone of the graft copolymer in the polymer composition may be polyvinylidene fluoride-co-chlorotrifluoroethylene (PVdF-co-CTFE). The backbone may have chlorine (or bromine or iodine) thereon or in a branch thereof. The chlorine (or bromine or iodine) may facilitate synthesis of the binder composition including the graft copolymer.

An amount of the pendant chain in the graft copolymer may be about 1 wt % to about 99.99 wt %, based on a total weight of the graft copolymer. In an implementation, the amount of the pendant chain may be, e.g., about 1 wt % to about 89.99 wt % or about 1 wt % to about 79.99 wt %, based on a total weight of the graft copolymer.

The pendant chain may have a weight average molecular weight of about 100 g/mol to about 1000,000 g/mol. In an implementation, the pendant chain may have a weight average molecular weight of, e.g., about 100 g/mol to about 900,000 g/mol or about 100 g/mol to about 800,000 g/mol. When the amount and the weight average molecular weight of the pendant chain are within these ranges, the binder composition may have appropriate hydrophilic properties to help improve adhesion between the porous substrate and the inorganic oxide or adhesion between adjacent particles of the inorganic oxide.

The hydrophilic repeating unit of the pendant chain may be prepared from a vinyl-based monomer. For example, the hydrophilic repeating unit may be prepared from at least one selected from an acrylic acid vinyl monomer, a butyl acrylate vinyl monomer, a triethylene glycol acrylate vinyl monomer, an acrylonitrile vinyl monomer, an acrylamide vinyl monomer, a 2-hydroxyethyl acrylate vinyl monomer, a maleic anhydride vinyl monomer, an ethylene glycol vinyl ether vinyl monomer, or an itaconic acid vinyl monomer. These vinyl monomers have carbon double bonds that may facilitate synthesis of a graft polymer with a pendent chain grafted on the backbone.

An amount of the graft copolymer in the binder composition may be from about 0.1 wt % to about 100 wt %, based on a total weight of the binder composition. When the amount of the graft copolymer is within this range, the binder composition may help improve adhesion between the porous substrate and the inorganic oxide and between adjacent particles of the inorganic oxide, and may help improve lifetime characteristics of lithium battery including the same. In an implementation, the graft copolymer may be included in the binder composition along with other binders.

According to another embodiment, a separator may include, e.g., a porous substrate; a coating layer on at least one surface of the porous substrate and including an inorganic oxide; and a binder between the porous substrate and the inorganic oxide, or between adjacent particles of the inorganic oxide. The binder may include or may be prepared from the binder composition of the graft copolymer according to any of the above-described embodiments. A lithium battery including the separator may have improved lifetime. FIG. 1 illustrates a schematic view of a separator according to an embodiment. For example, the separator 10 may include the porous substrate 1, and the inorganic oxide 2 and binder 3 on the porous substrate 1.

The inorganic oxide may include at least one selected from $\alpha$-$Al_2O_3$, $\gamma$-Al(O)OH, $TiO_2$, $ZrO_2$, and $SiO_2$. For example, the inorganic oxide may include $\alpha$-$Al_2O_3$. In an implementation, the inorganic oxide may further include a gibbsite ($\gamma$-$Al(OH)_3$), $BaTiO_3$, $Pb(Zr,Ti)O_3$(PZT), $Pb_{1-x}LaZr_{1-y}Ti_yO_3$(PLZT), $PB(Mg_{2/3}Nb_{2/3})O_3$—$PbTiO_3$ (PMN-PT), $HfO_2$, $SrTiO_3$, SiC, $SnO_2$, $CeO_2$, or a mixture thereof.

The inorganic oxide may further include a lithium ion-conductive ceramic. Examples of the lithium ion-conductive ceramic may include lithium phosphate ($Li_3PO_4$), lithium titanium phosphate ($Li_xTi_y(PO_4)_3$, where $0<x<2$, and $0<y<3$), lithium aluminum titanium phosphate ($Li_xAl_yTi_z(PO_4)_3$, where $0<x<2$, $0<y<1$, and $0<z<3$) lithium aluminum titanium phosphate doped with zirconium (Zr), hafnium (Hf), or rutherfordium (Rf) ($Li_{1+x}Al_xTi_{2-x}M_\alpha(PO_{4+\beta})_3$, where $0<x<0.5$, $0\le\alpha\le0.1$, $0\le\beta\le0.1$, M is Zr, Hf, or Rf), lithium aluminum titanium phosphate doped with silicon ($Li_{1+x+y}Al_xTi_{2-x}Si_yP_{3-y}O_{12}$, where $0\le x\le1$, and $0\le y\le1$), or a mixture thereof.

An amount of the binder composition in the separator may be about 1 wt % to about 50 wt %, based on a total weight of the inorganic oxide. In an implementation, the amount of the binder composition in the separator may be, e.g., about 1 wt % to about 45 wt % or about 1 wt % to about 40 wt %, based on the total weight of the inorganic oxide. When the amount of the binder composition is within these ranges, the binder composition may maintain binding strength between adjacent particles of the inorganic oxide in that the adjacent particles of the inorganic oxide in the coating layer may retain an appropriate size of pores not to hinder migration of lithium ions.

The porous substrate may be a polyolefin-based porous substrate. For example, the porous substrate may be a membrane substrate or a fibrous substrate that are formed of polyethylene, polypropylene, or a mixture thereof.

The porous substrate may have a mixed multilayer structure. For example, the porous substrate may be a two-layered separator including polyethylene and polypropylene layers, a three-layered separator including polyethylene, polypropylene and polyethylene layers, or a three-layered separator including polypropylene, polyethylene and polypropylene layers.

An adhesion of the binder formed from binder composition to the porous substrate may be about 40 mN/mm or greater, e.g., about 50 mN/mm or greater.

According to another embodiment, a lithium battery may include, e.g., a cathode including a cathode active material; an anode including an anode active material; and a separator according to the above-described embodiments between the cathode and the anode.

Figure 3:
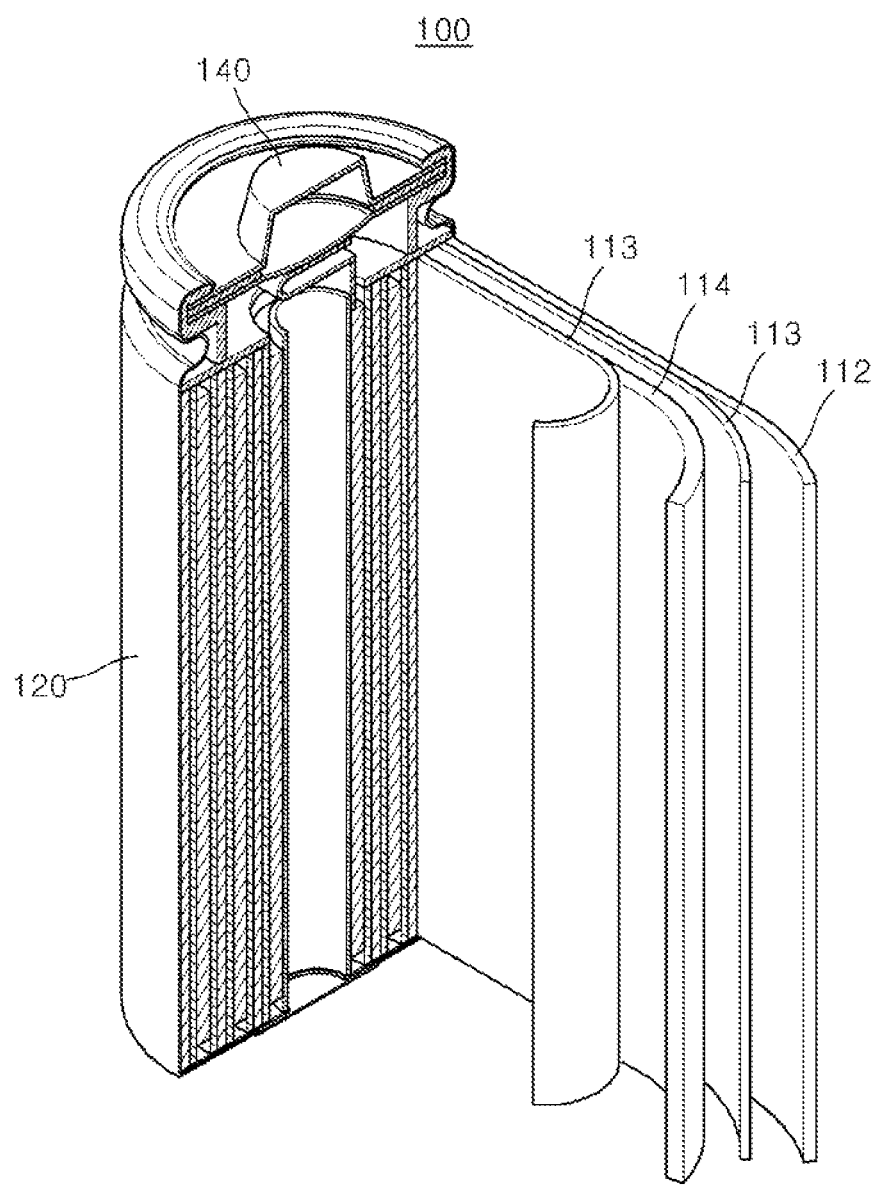
FIG. 3 illustrates an exploded perspective view of a structure of a lithium secondary battery 100 according to an embodiment.

FIG. 3 illustrates an exploded perspective view of a structure of a lithium secondary battery 100 according to an embodiment.

Although the lithium secondary 100 illustrated in FIG. 3 is cylindrical, lithium secondary batteries according to the embodiments may be of a rectangular type or a pouch type.

Lithium secondary batteries may be classified as, e.g., lithium ion batteries, lithium ion polymer batteries, or lithium polymer batteries, according to the type of separator and/or electrolyte included therein. In addition, lithium batteries may be classified as, e.g., cylindrical type, rectangular type, coin type, or pouch type, according to the shape thereof. Lithium batteries may also be classified as, e.g., bulk type or thin film type, according to the size thereof. According to embodiments, the lithium battery may have a suitable shape.

Referring to FIG. 3, the lithium secondary battery 100 in cylindrical form may include an anode 112, a cathode 114, a separator 113 between the anode 112 and the cathode 114, and an electrolyte (not shown) impregnated into the anode 112, the cathode 114, and the separator 113, a battery case 120, and a sealing member 140 sealing the battery case 120. The lithium secondary battery 100 may be manufactured by sequentially stacking the anode 112, the separator 113, and the cathode 114 upon one another to form a stack, rolling the stack in a spiral form, and accommodating the rolled up stack in the battery case 120.

The anode 112 may include a current collector and a anode active material layer on the current collector.

The current collector for the anode 112 may be, e.g., a Cu current collector. In an implementation, the current collector may include, e.g., stainless steel, aluminum, nickel, titanium, thermally-treated carbon, copper or stainless steel that is surface-treated with carbon, nickel, titanium, or silver, and aluminum-cadmium alloys. In addition, the anode current collector may be processed to have fine irregularities on surfaces thereof so as to help enhance adhesive strength of the current collector to the anode active material, and may be used in any of various forms including films, sheets, foils, nets, porous structures, foams, and non-woven fabrics.

An anode active material for the anode active material layer may include a suitable anode active material. Examples of the anode active material may include lithium metal, a metal that is alloyable with lithium, a transition metal oxide, a material that allows doping or undoping of lithium, a material that allows reversible intercalation and deintercalation of lithium ions, and the like.

Examples of the transition metal oxide may include a tungsten oxide, a molybdenum oxide, a titanium oxide, a lithium titanium oxide, a vanadium oxide, and a lithium vanadium oxide.

Examples of the material that allows doping or undoping of lithium may include silicon (Si), $SiO_x$ wherein $0<x<2$, an Si—Y alloy wherein Y is an alkali metal, an alkali earth metal, a Group 13 to Group 16 element, a transition metal, a rare earth element, or combinations thereof (except for Si), Sn, $SnO_2$, an Sn—Y alloy wherein Y is an alkali metal, an alkali earth metal, a Group 13 to Group 16 element, a transition metal, a rare earth element, or a combination thereof (except for Sn), and combinations of at least one of these materials and $SiO_2$. Y may be, e.g., magnesium (Mg), calcium (Ca), strontium (Sr), barium (Ba), radium (Ra), scandium (Sc), yttrium (Y), titanium (Ti), zirconium (Zr), hafnium (Hf), rutherfordium (Rf), vanadium (V), niobium (Nb), tantalum (Ta), dubnium (Db), chromium (Cr), molybdenum (Mo), tungsten (W), seaborgium (Sg), technetium (Tc), rhenium (Re), bohrium (Bh), iron (Fe), lead (Pb), ruthenium (Ru), osmium (Os), hassium (Hs), rhodium (Rh), iridium (Ir), palladium (Pd), platinum (Pt), copper (Cu), silver (Ag), gold (Au), zinc (Zn), cadmium (Cd), boron (B), aluminum (Al), gallium (Ga), tin (Sn), indium (In), titanium (Ti), germanium (Ge), phosphorus (P), arsenic (As), antimony (Sb), bismuth (Bi), sulfur (S), selenium (Se), tellurium (Te), polonium (Po), or combinations thereof.

The material that allows reversible intercalation and deintercalation of lithium ions may be a suitable carbonaceous negative active material that is used in a lithium battery. Examples of such carbonaceous materials may include crystalline carbon, amorphous carbon, or mixtures thereof. Examples of the crystalline carbon may include natural graphite and artificial graphite that are in amorphous, plate, flake, spherical or fibrous form. Examples of the amorphous carbon may include soft carbon (carbon sintered at low temperatures), hard carbon, meso-phase pitch carbides, and sintered corks.

The anode active material layer may also include a binder and a conducting agent.

The binder may strongly bind anode active material particles together and to a current collector. Examples of the binder may include polyvinyl alcohol, carboxymethyl cellulose, hydroxypropyl cellulose, diacetyl cellulose, polyvinyl chloride, carboxylated polyvinyl chloride, polyvinyl fluoride, a polymer including ethylene oxide, polyvinylpyrrolidone, polyurethane, polytetrafluoroethylene, polyvinylidene fluoride, polyethylene, polypropylene, styrene-butadiene rubber (SBR), acrylated SBR, epoxy resin, and nylon.

The conducting agent may be used for providing conductivity to the anode. A suitable electron conducting material that does not induce chemical change in batteries may be used. Examples of the conducting agent may include natural graphite, artificial graphite, carbon black, acetylene black, ketjen black, carbon fibers, metal powder or metal fiber of copper (Cu), nickel (Ni), aluminum (Al), silver (Ag), and conductive materials, such as polyphenylene derivatives, which may be used along or in a combination of at least two thereof.

Amounts of the anode active material, the binder, and the conducting agent may be those levels normally used in lithium batteries. For example, a weight ratio of the anode active material to a mixture of the conducting agent and the binder may be about 98:2 to about 92:8. A mixing ratio of the conducting agent to the binder may be about 1:1.0 to about 1:3.

The cathode 114 may include a current collector and a cathode active material layer on the current collector.

An Al current collector may be used as the cathode current collector. In an implementation, similar to the anode current collector, the cathode current collector may also be processed to have fine irregularities on a surface thereof so as to enhance the adhesive strength of the cathode current collector to the cathode active material, and may be used in any of various forms, including a film, a sheet, a foil, a net, a porous structure, foam, and non-woven fabric.

The cathode active material may include a suitable cathode active material. For example, a compound that allows reversible intercalation and deintercalation of lithium may be used. For example, at least one composite oxide of a metal selected from Co, Mn, Ni, and a combination thereof with lithium may be used. Examples of the composite oxide may include compounds represented by $Li_aA_{1-b}B1_bD_2$ (where $0.90 \leq a \leq 1.8$, and $0 \leq b \leq 0.5$); $Li_aE_{1-b}B1_bO_{2-c}D_c$ (where $0.90 \leq a \leq 1.8$, $0 \leq b \leq 0.5$, and $0 \leq c \leq 0.05$); $LiE_{2-b}B1_bO_{4-c}D_c$ (where $0 \leq b \leq 0.5$, and $0 \leq c \leq 0.05$); $Li_aNi_{1-b-c}Co_bB1_cD_\alpha$ (where $0.90 \leq a \leq 1.8$, $0 \leq b \leq 0.5$, $0 \leq c \leq 0.05$, and $0 < \alpha \leq 2$); $Li_aNi_{1-b-c}Co_bB1_cO_{2-\alpha}F1_\alpha$ (where $0.90 \leq a \leq 1.8$, $0 \leq b \leq 0.5$, $0 \leq c \leq 0.05$, and $0 < \alpha < 2$); $Li_aNi_{1-b-c}Co_bB1_cO_{2-\alpha}F1_2$ (where $0.90 \leq a \leq 1.8$, $0 \leq b \leq 0.5$, $0 \leq c \leq 0.05$, and $0 < \alpha < 2$); $Li_aNi_{1-b-c}Mn_bB1_cD_\alpha$ (where $0.90 \leq a \leq 1.8$, $0 \leq b \leq 0.5$, $0 \leq c \leq 0.05$, and $0 < \alpha \leq 2$); $Li_aNi_{1-b-c}Mn_bB1_cO_{2-\alpha}F1_\alpha$ (where $0.90 \leq a \leq 1.8$, $0 \leq b \leq 0.5$, $0 \leq c \leq 0.05$, and $0 < \alpha < 2$); $Li_aNi_{1-b-c}Mn_bB1_cO_{2-\alpha}F1_2$ (where $0.90 \leq a \leq 1.8$, $0 \leq b \leq 0.5$, $0 \leq c \leq 0.05$, and $0 < \alpha < 2$); $Li_aN i_bE_cG_dO_2$ (where $0.90 \leq a \leq 1.8$, $0 \leq b \leq 0.9$, $0 \leq c \leq 0.5$, and $0.001 \leq d \leq 0.1$); $Li_aNi_bCo_cMn_dG_eO_2$ (where $0.90 \leq a \leq 1.8$, $0 \leq b \leq 0.9$, $0 \leq c \leq 0.5$, $0 \leq d \leq 0.5$, and $0.001 \leq e \leq 0.1$); $Li_aNiG_bO_2$ (where $0.90 \leq a \leq 1.8$, and $0.001 \leq b \leq 0.1$); $Li_aCoG_bO_2$ (where $0.90 \leq a \leq 1.8$, and $0.001 \leq b \leq 0.1$); $Li_aMnG_bO_2$ (where $0.90 \leq a \leq 1.8$, and $0.001 \leq b \leq 0.1$); $Li_aMn_2G_bO_4$ (where $0.90 \leq a \leq 1.8$, $0.001 \leq b \leq 0.1$); $LiQO_2$; $LiQS_2$; $LiV_2O_5$; $LiZO_2$; $LiNiVO_4$; $Li_{(3-f)}J_2(PO_4)_3$ ($0 \leq f \leq 2$); $Li_{(3-f)}Fe_2(PO_4)_3$ (where $0 \leq f \leq 2$); and $LiFePO_4$.

For example, the cathode active material may be $LiMn_2O_4$, $LiNi_2O_4$, $LiCoO_2$, $LiNiO_2$, $LiMnO_2$, $Li_2MnO_3$, $LiFePO_4$, or $LiNi_xCo_yO_2$ (where $0 < x \leq 0.15$, and $0 < y \leq 0.85$).

In the formulae above, A may be selected from the group of nickel (Ni), cobalt (Co), manganese (Mn), and combinations thereof; B1 may be selected from the group of aluminum (Al), nickel (Ni), cobalt (Co), manganese (Mn), chromium (Cr), iron (Fe), magnesium (Mg), strontium (Sr), vanadium (V), a rare earth element, and combinations thereof; D may be selected from the group of oxygen (O), fluorine (F), sulfur (S), phosphorus (P), and combinations thereof; E may be selected from the group of cobalt (Co), manganese (Mn), and combinations thereof; F1 may be selected from the group of fluorine (F), sulfur (S), phosphorus (P), and combinations thereof; G may be selected from the group of aluminum (Al), chromium (Cr), manganese (Mn), iron (Fe), magnesium (Mg), lanthanum (La), cerium (Ce), strontium (Sr), vanadium (V), and combinations thereof; Q may be selected from the group of titanium (Ti), molybdenum (Mo), manganese (Mn), and combinations thereof; Z is selected from the group consisting of chromium (Cr), vanadium (V), iron (Fe), scandium (Sc), yttrium (Y), and combinations thereof; and J may be selected from the group of vanadium (V), chromium (Cr), manganese (Mn), cobalt (Co), nickel (Ni), copper (Cu), and combinations thereof.

The compounds listed above as cathode active materials may have a coating layer on a surface thereof. In an implementation, a mixture of a compound without having a coating layer and a compound having a coating layer, the compounds being selected from the compounds listed above, may be used. The coating layer may include at least one compound of a coating element selected from the group of oxide, hydroxide, oxyhydroxide, oxycarbonate, and hydroxycarbonate of the coating element. The compounds for the coating layer may be amorphous or crystalline. The coating element for the coating layer may be, e.g., magnesium (Mg), aluminum (Al), cobalt (Co), potassium (K), sodium (Na), calcium (Ca), silicon (Si), titanium (Ti), vanadium (V), tin (Sn), germanium (Ge), gallium (Ga), boron (B), arsenic (As), zirconium (Zr), or mixtures thereof. The coating layer may be formed using a suitable method that does not adversely affect the physical properties of the cathode active material when a compound of the coating element is used. For example, the coating layer may be formed using a spray coating method, a dipping method, or the like.

The cathode active material layer may include a binder and a conducting agent.

The binder may strongly bind cathode active material particles together and to a current collector. Examples of the binder may include polyvinyl alcohol, carboxymethyl cellulose, hydroxypropyl cellulose, diacetyl cellulose, polyvinyl chloride, carboxylated polyvinyl chloride, polyvinyl fluoride, a polymer including ethylene oxide, polyvinylpyrrolidone, polyurethane, polytetrafluoroethylene, polyvinylidene fluoride, polyethylene, polypropylene, styrene-butadiene rubber (SBR), acrylated SBR, epoxy resin, and nylon.

The conducting agent may be used for providing conductivity to the cathode. A suitable electron conducting material that does not induce chemical change in batteries may be used. Examples of the conducting agent may include natural graphite, artificial graphite, carbon black, acetylene black, ketjen black, carbon fibers, metal powder or metal fiber of copper (Cu), nickel (Ni), aluminum (Al), silver (Ag), and conductive materials, such as polyphenylene derivatives, which may be used along or in a combination of at least two thereof.

Amounts of the cathode active material, the binder, and the conducting agent may be those levels suitably used in lithium batteries. For example, a weight ratio of the cathode active material to a mixture of the conducting agent and the binder may be about 98:2 to about 92:8. A mixing ratio of the conducting agent to the binder may be about 1:1.0 to about 1:3.

The anode 112 and the cathode 114 may be each manufactured by mixing an active material, a binder, and a conducting agent in a solvent to prepare an active material composition, and coating the active material composition on a current collector. In an implementation, N-methylpyrrolidone may be used as the solvent. An amount of the solvent included in the composition may be about 1 part to about 10 parts by weight, based on 100 parts by weight of the anode active material or cathode active material.

The separator 113 may be between the cathode 114 and the anode 112. The separator 113 may include a binder prepared from any of the binder compositions according to the above-described embodiments (that include a graft copolymer having a backbone including a repeating unit derived from a polyvinylidene fluoride (PVdF)-based polymer or copolymer in which fluorine atoms are partially substituted with at least one element of chlorine (Cl), bromine (Br) and iodine (I), and a pendant chain grafted on the backbone, the pendant chain including a hydrophilic repeating unit). A lithium battery with improved lifetime characteristics may be manufactured using such a separator including a binder formed from the binder composition able to help improve adhesions between the porous substrate and the inorganic oxide and between adjacent particles of the inorganic oxide.

The separator 113 may include the binder or binder composition in which an amount of the fluorine atom in a backbone thereof that is partially substituted with at least one of Cl, Br, and I is about 1 wt % to about 10 wt %, based on a total weight of the fluorine atoms in the backbone. For example, the separator 113 may include the binder or binder composition in which the amount of the fluorine atom partially substituted with at least one of Cl, Br, and I is about 1 wt % to about 9 wt %, based on a total weight of the fluorine atoms in the backbone. For example, the separator 113 may include the binder or binder composition in which the amount of the fluorine atom partially substituted with at least one of Cl, Br, and I is about 1 wt % to about 8 wt %, based on a total weight of the fluorine atoms in the backbone. When the amount of the fluorine atom partially substituted with at least one of Cl, Br, and I is within these ranges in the binder or binder composition of the separator, the binder from the binder composition may have appropriate hydrophilic properties for improving the adhesions between the porous substrate and the inorganic oxide and adjacent particles of the inorganic oxide.

The types of the backbones in the binder composition, the amount and weight average molecular weight of the pendant chain, types of the hydrophilic repeating units of the pendant chain, and the amount of the graft copolymer have been described in the above-embodiments, and thus detailed description thereof in connection with the separator may be omitted here.

According to another embodiment, a method of preparing a binder composition including a graft copolymer may include, e.g., radicalizing a moiety of a backbone derived from a polyvinylidene fluoride (PVdF)-based polymer or copolymer in which fluorine atoms are partially substituted with at least one element of chlorine (CO, bromine (Br) and iodine (I), with a catalyst (the moiety of the backbone being a substitution site of the fluorine atom by the at least one element of Cl, Br, and I); and graft-polymerizing the radicalized moiety of the backbone and a carbon double bond in a pendant chain having a hydrophilic repeating unit to form the graft copolymer.

Figure 2:
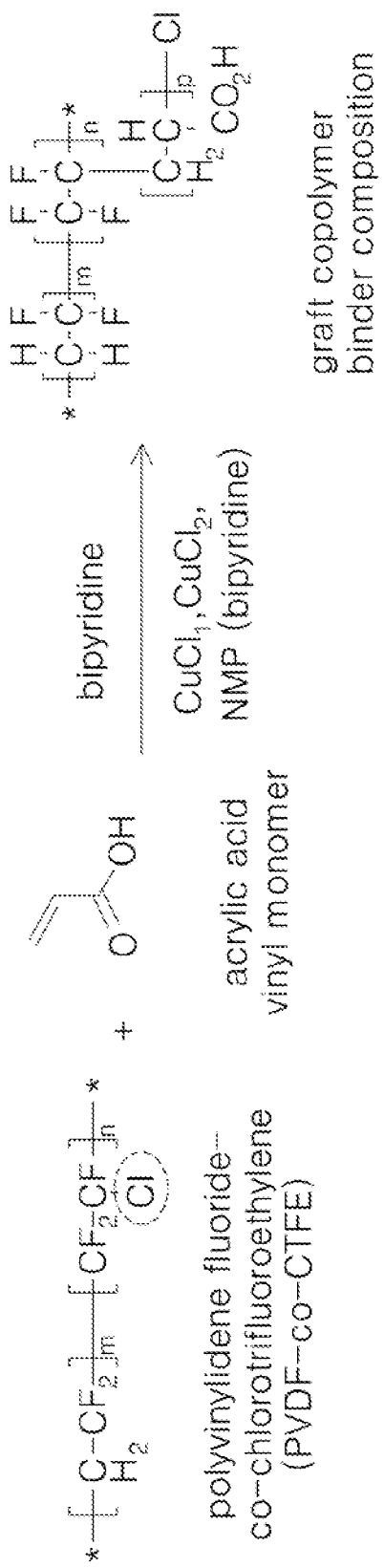
FIG. 2 illustrates a reaction scheme of preparing a copolymer according to an embodiment.

In the method of preparing the binder composition via an atom transfer radical polymerization (ATRP) reaction, free radicals may be concentrated mainly on the backbone and may remain in a low concentration. Thus, it may be easy to control the free radicals to prevent unwanted reactions. FIG. 2 illustrates a reaction scheme of preparing a copolymer according to an embodiment.

The catalyst may include a ligand and a metal halide. For example, the catalyst may include bipyridine, and at least one of Cu(I)Cl and Cu(II)Cl$_2$. A suitable catalyst available for ATRP may be used.

The backbone of the graft copolymer in the binder composition may be derived from, e.g., polyvinylidene fluoride-co-chlorotrifluoroethylene, or polyvinylidene fluoride-co-chlorotrifluoroethylene/polyvinylidene fluoride-co-hexafluoropropylene (PVdF-co-CTFE/PVdF-co-HFP).

The hydrophilic repeating unit of the pendant chain of the graft copolymer in the binder composition may be derived from a vinyl-based monomer.

The following Examples and Comparative Examples are provided in order to highlight characteristics of one or more embodiments, but it will be understood that the Examples and Comparative Examples are not to be construed as limiting the scope of the embodiments, nor are the Comparative Examples to be construed as being outside the scope of the embodiments. Further, it will be understood that the embodiments are not limited to the particular details described in the Examples and Comparative Examples.

EXAMPLES

Example 1

Preparation of Binder Composition

After 100 g of a solution of polyvinylidene fluoride-co-chlorotrifluoroethylene (PVdF-co-CTFE, Kureha Corp., Kureha#7500, weight average molecular weight; 700,000 g/mol, chlorotrifluoroethylene (CTFE); 4.3 mmol, solid content; 9.9 g) dissolved in N-methyl-2-pyrrolidone was put in a reaction vessel, 124 g (1.73 mol, 405 eq) of acrylic acid (available from Aldrich Chemical Co.), 30.0 g (0.19 mol, 45 eq) of bipyridine, 6.33 g (64 mmol, 15 eq) of Cu(I)Cl, and 0.86 g (6.4 mmol, 1.5 eq.) of Cu(II)Cl$_2$ were added thereto, and dissolved in N-methyl-2-pyrrolidone, and the reaction vessel was sealed with a rubber barrier.

The resulting mixture was stirred for about 10 minutes, purged with an argon gas, and then reacted at 140° C. for about 24 hours to precipitate a graft copolymer in water, followed by drying the graft copolymer.

Next, the graft copolymer was dissolved again in N-methyl-2-pyrrolidone and then precipitated again in water. The resulting precipitate was purified and dried in a vacuum oven overnight to obtain a binder composition including a graft copolymer having a polyvinylidene fluoride-co-chlorotrifluoroethylene backbone with a repeating unit of an acrylic acid vinyl monomer and a pendant chain grafted on the backbone.

An amount of the pendant chain was about 6.3 wt %, based on a total weight of the graft copolymer.

Example 2

Preparation of Binder Composition

After 100 g of a solution of polyvinylidene fluoride-co-chlorotrifluoroethylene (PVdF-co-CTFE, Kureha Corp., Kureha#7500, weight average molecular weight; 700,000 g/mol, chlorotrifluoroethylene (CTFE); 4.3 mmol, solid content; 9.9 g) dissolved in N-methyl-2-pyrrolidone was put in a reaction vessel, 124 g (1.73 mol, 405 eq) of acrylic acid (available from Aldrich Chemical Co.), 30.0 g (0.19 mol, 45 eq) of bipyridine, 6.33 g (64 mmol, 15 eq) of Cu(I)Cl, and 0.86 g (6.4 mmol, 1.5 eq.) of Cu(II)Cl$_2$ were added thereto, and dissolved in N-methyl-2-pyrrolidone, and the reaction vessel was sealed with a rubber barrier.

The resulting mixture was stirred for about 10 minutes, purged with an argon gas, and then reacted at 140° C. for about 12 hours to precipitate a graft copolymer in water, followed by drying the graft copolymer.

Next, the graft copolymer was dissolved again in N-methyl-2-pyrrolidone and then precipitated again in water. The resulting precipitate was purified and dried in a vacuum oven overnight to obtain a binder composition including a graft copolymer having a polyvinylidene fluoride-co-chlorotrifluoroethylene backbone with a repeating unit of an acrylic acid vinyl monomer and a pendant chain grafted on the backbone.

An amount of the pendant chain was about 3 wt % based on a total weight of the graft copolymer.

Comparative Example 1

Preparation of Binder Composition

Polyvinylidene fluoride-co-chlorotrifluoroethylene (PVdF-co-CTFE, Kureha Corp., Kureha#7500, weight average molecular weight; 700,000 g/mol) was prepared as a binder composition.

Comparative Example 2

Preparation of Binder Composition 100 g of polyvinylidene fluoride-co-chlorotrifluoroethylene (PVdF-co-CTFE, Kureha Corp., Kureha#7500, weight average molecular weight; 700,000 g/mol, chlorotrifluoroethylene (CTFE); 4.3 mmol, solid content; 9.9 g) and 10 g of polyacrylic acid (weight average molecular weight 130,000 g/mol, available from Aldrich Chemical Co.) were dissolved in N-methyl-2-pyrrolidone in a reaction vessel.

The resulting mixture was stirred at about 40° C. for about 30 minutes, purified, and dried overnight in a vacuum oven to prepare a binder composition as a blend of polyvinylidene fluoride-co-chlorotrifluoroethylene and polyacrylic acid.

Example 3

Manufacture of Separator

A porous polyethylene substrate having a thickness of about 9 μm (available from Asahi) was prepared. α-Al$_2$O$_3$ powder having an average particle diameter of about 50 nm and the binder composition of Example 1 were mixed in a ratio of about 5:1 by weight to prepare a dispersion. The dispersion was coated on a surface of the porous polyethylene substrate by using a bar coater to form a coating layer. The resulting structure was heat-dried in an oven at about 50° C. for about 4 hours to prepare a separator having a thickness of about 12.1 μm with the coating layer on the surface of the porous polyethylene substrate.

A coating layer of the separator had a thickness of about 3.1 μm±0.3 μm.

Example 4

Manufacture of Separator

A separator was manufactured in substantially the same manner as in Example 3, except that the binder composition of Example 2 was used instead of the binder composition of Example 1.

A coating layer of the separator had a thickness of about 3 μm±0.3 μm.

Comparative Examples 3 and 4

Manufacture of Separator

Separators each having a thickness of about 12.0 μm were manufactured in substantially the same manner as in Example 3, except that the binder compositions of Comparative Examples 1 and 2 were used, respectively, instead of the binder composition of Example 1.

A coating layer of the separator manufactured from the binder composition of Comparative Example 1 had a thickness of about 3.0 μm. The separator manufactured from the binder composition of Comparative Example 2 had no coating layer due to phase separation of polymers.

Example 5

5-1. Manufacture of Cathode 97.2 parts by weight of LiCoO$_2$ powder, 1.5 parts by weight of a polyvinylidene fluoride (PVDF) as a binder, and 1.3 parts by weight of carbon black as a conducting agent were dispersed in an N-methylpyrrolidone solvent to prepare a slurry. The slurry was coated on an aluminum (Al) current collector to a thickness of about 145 μm with a doctor blade (a gap of about 170 mm), and then thermally treated at about 100° C. in a vacuum for about 5.5 hours, followed by roll-pressing to manufacture a cathode plate having a cathode active material layer. The cathode plate was cut to a stripe of about 457 mm (width) and 65.5 mm (height), thereby manufacturing a cathode.

5-2. Manufacture of Anode 98 parts by weight of graphite, 1 part by weight of styrene-butadiene rubber as a binder, and 1 part by weight of carboxymethylcellulose (CMC) as a thickening agent were dispersed in a N-methylpyrrolidone solvent by using an agate mortar to prepare a slurry. The slurry was coated on an Al current collector to a thickness of about 140 µm with a doctor blade (a gap of about 160 mm), and then thermally treated in a vacuum oven at about 145° C. for about 6.5 hours, followed by drying an roll-pressing to manufacture an anode plate having an anode active material layer. The anode plate was cut to a strip of about 448 mm (width) and about 66.5 mm (height), thereby manufacturing an anode.

5-3. Preparation of Separator

The separator of Example 1 was prepared.

5-4. Manufacture of Lithium Battery

The cathode manufactured as in Section 5-1, the anode manufactured as in Section 5-2, and the separator of Example 1 were assembled to manufacture an electrode assembly. The electrode assembly was put in a case, and then an electrolyte solution of 1.13 M $LiPF_6$ in a mixed solvent of ethylene carbonate (EC), dimethylene carbonate (DMC) and diethylene carbonate (DEC)(in a volume ratio of about 3:5:2) was injected into the case, followed by vacuum sealing to manufacture a lithium battery.

Example 6

A lithium battery was manufactured in substantially the same manner as in Example 5, except that the separator of Example 2 was used instead of the separator of Example 1.

Comparative Examples 5 and 6

Lithium batteries were manufactured in substantially the same manner as in Example 5, except that the separators of Comparative Examples 1 and 2 were used, respectively, instead of the separator of Example 1.

Evaluation Example 1

Identification Test of Graft Copolymer Binder Composition

Whether the binder compositions of Example 1 and Comparative Example 1 were graft copolymer binder compositions including graft copolymers were identified using the following methods.

1-1. Infrared Spectroscopy (IR) Test

The binder compositions of Example 1 and Comparative Example 1 were analyzed by infrared spectroscopy (IR). The results are shown in FIGS. 4A and 4B.

Figure 4A:
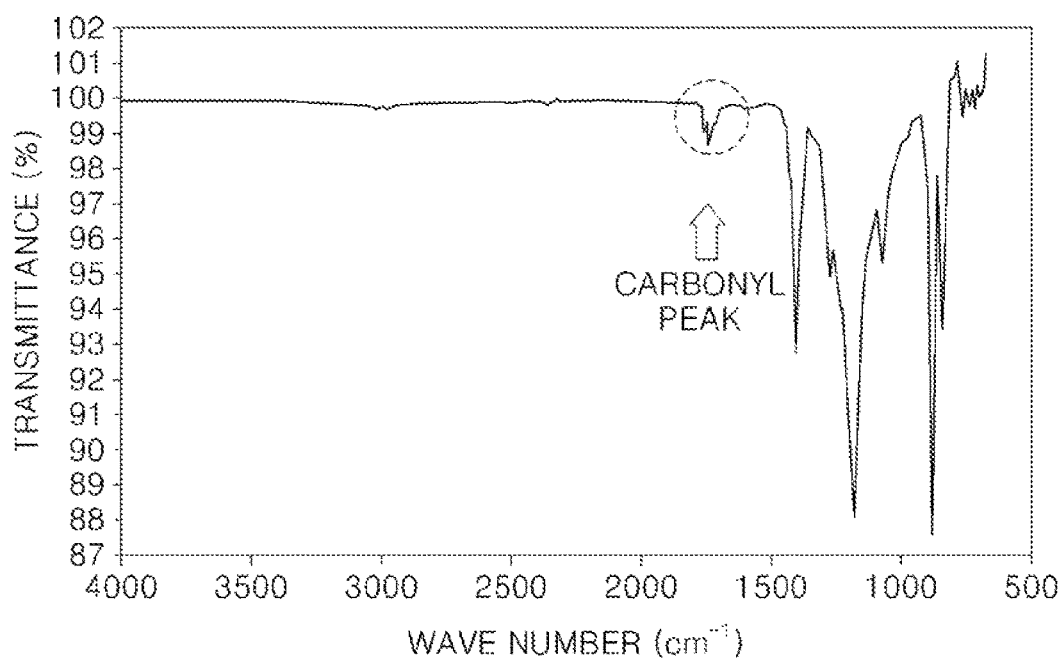
FIG. 4A illustrates an infrared (IR) spectrum of a binder composition of Example 1.
Figure 4B:
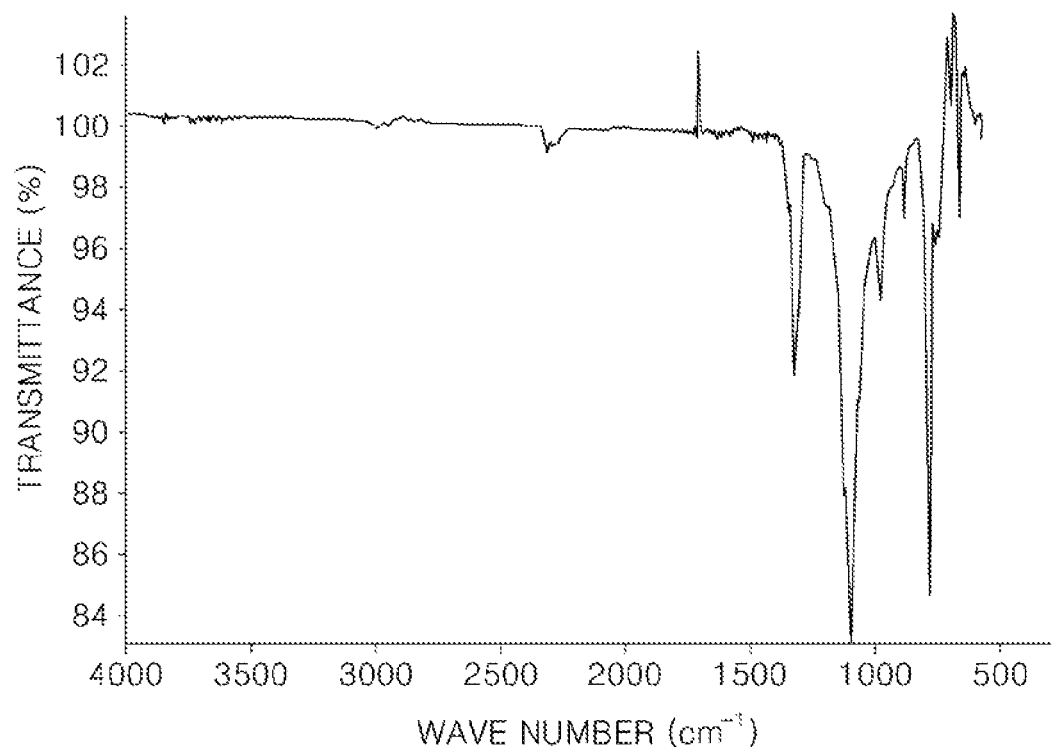
FIG. 4B illustrates an IR spectrum of a binder composition of Comparative Example 1.

Referring to FIG. 4A, the binder composition of Example 1 exhibited a carbonyl peak at a wave number of less than about 1500 $cm^{-1}$ to about 2000 $cm^{-1}$. However, such a carbonyl peaks was not observed from the binder composition of Comparative Example 1, as shown in FIG. 4B. These results support that the binder composition of Example 1 included a graft copolymer with a pendant chain grafted on a polyvinylidene fluoride-co-chlorotrifluoroethylene backbone having a repeating unit of an acrylic acid vinyl monomer.

1-2. $^{19}$F-NMR Test

A $^{19}$F-NMR test was performed on the binder compositions of Example 1 and Comparative Example 1. The results are shown in FIG. 5.

Figure 5:
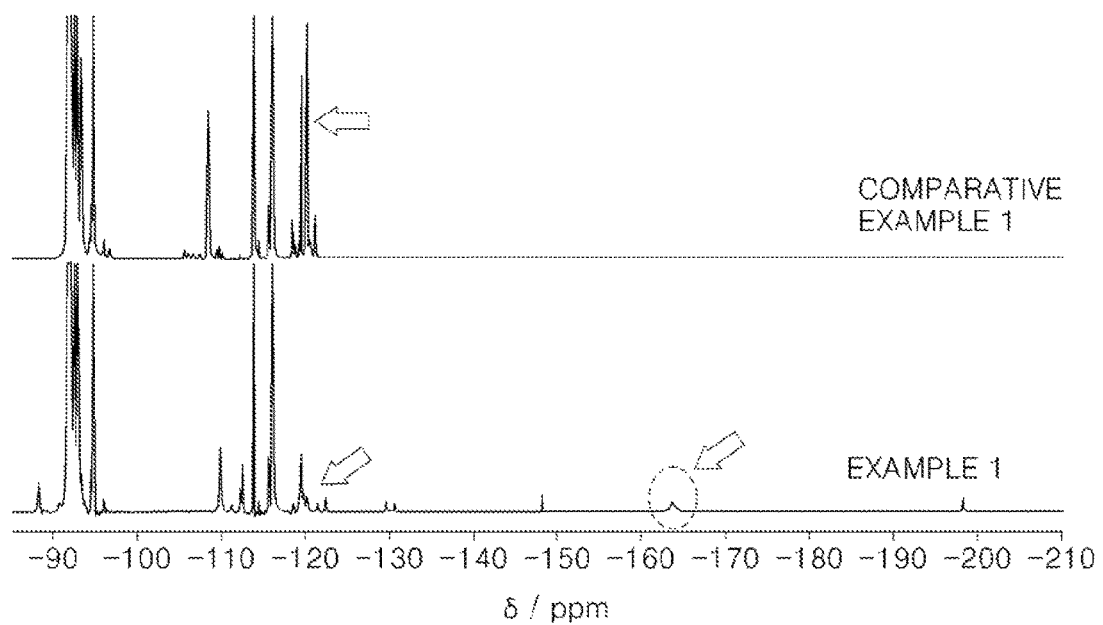
FIG. 5 illustrates $^{19}$F-nuclear magnetic resonance (NMR) spectra of the binder compositions of Example 1 and Comparative Example 1.

Referring to FIG. 5, the binder compositions of Example 1 and Comparative Example 1 both exhibited peaks from fluorine atoms in the polyvinylidene fluoride-co-chlorotrifluoroethylene backbone at a chemical shift (δ) of about −120 ppm, with a weaker peak intensity of the peak from the fluorine atoms in the binder composition of Example 1 than that from the fluorine atoms in the binder composition of Comparative Example 1. The binder composition of Example 1 also exhibited another peak from fluorine atoms at a chemical shift (δ) of from about −160 ppm to about −170 ppm. These results support that the binder composition of Example 1 included a graft copolymer with a pendant chain grafted on a polyvinylidene fluoride-co-chlorotrifluoroethylene backbone and having a repeating unit of an acrylic acid vinyl monomer.

1.3. Gel Permeation Chromatography (GPC) Test

A gel permeation chromatography (GPC) test was performed on the binder compositions of Example 1 and Comparative Example 1. The results are shown in FIG. 6.

Figure 6:
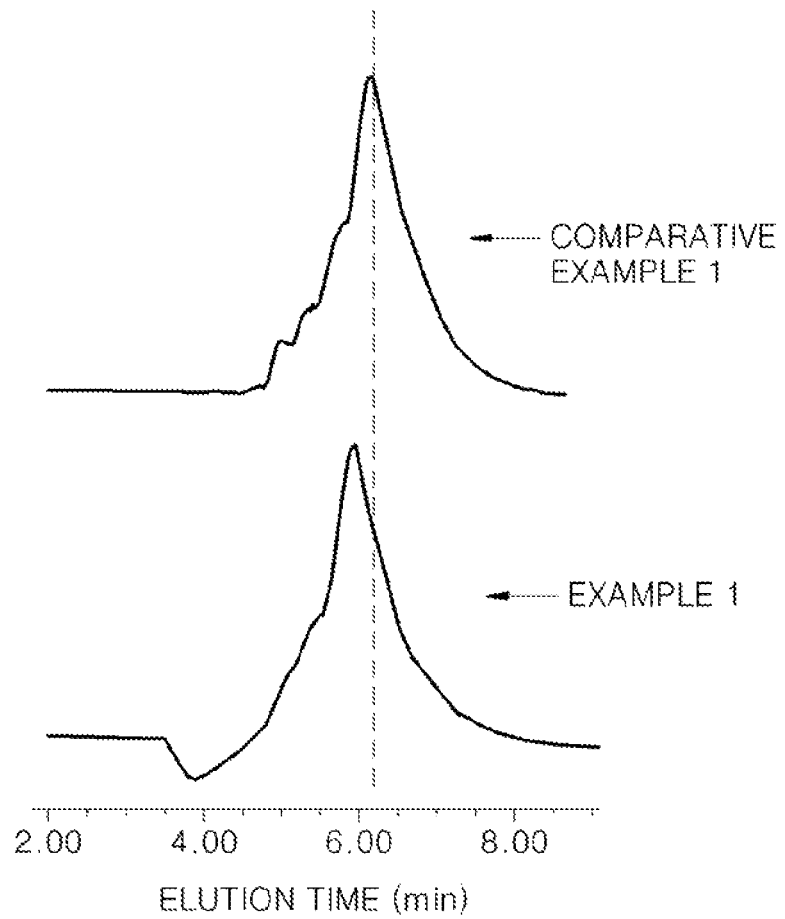
FIG. 6 illustrates gel-permeation chromatographic (GPC) spectra of the binder compositions of Example 1 and Comparative Example 1.

Referring to FIG. 6, an elution time of the binder composition of Example 1 was found to be faster than that of the binder composition of Comparative Example 1, indicating that the binder composition of Example 1 had a larger molecular weight than the binder composition of Comparative Example 1 and that the binder composition of Example 1 included a graft copolymer with a pendant chain grafted on a polyvinylidene fluoride-co-chlorotrifluoroethylene backbone and having a repeating unit of an acrylic acid vinyl monomer.

Evaluation Example 2

Adhesion Evaluation

Figure 7:
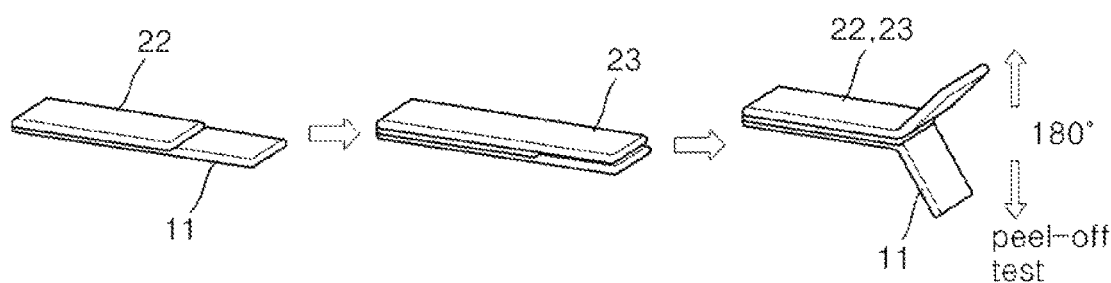
FIG. 7 illustrates a schematic view stages in a method of evaluating adhesions of the binder compositions of Examples 1 and Comparative Examples 1 and 2 to a porous substrate.

The binder compositions of Example 1 and Comparative Examples 1 and 2 were each coated on a surface of a porous polyethylene substrate having a thickness of about 9 µm (GC0910, available from Toray BSF) to form a coating layer. To evaluate adhesion of the coating layer, a 3M tape 23 having a length and a width was attached to the coating layer 22, and then peeled off of the coating layer 22 by using a tensile tester (available from Shimadzu) (180-degree peel-off test) to measure the force (mN/mm) required to peel off the coating layer 22 from the porous polyethylene substrate 11 as the adhesion of the coating layer 22 to the porous polyethylene substrate 11. This adhesion evaluation method is illustrated in FIG. 7. The results are shown in Table 1, below.

TABLE 1

| Example | Thickness of coating layer (µm) | Air permeability (sec/100 mL) | Adhesion (mN/mm) |
|---|---|---|---|
| Example 1 | 3.1 | 212 | 58.1 |
| Comparative Example 1 | 3.0 | 223 | 28.2 |
| Comparative Example 2 | — | — | — |

Referring to Table 1, the adhesions of the binder compositions of Example 1 and Comparative Example 1 to the porous polyethylene substrate were about 58.1 mN/mm and about 28.2 mN/mm, respectively. The adhesion of the binder composition of Example 1 to the porous polyethylene substrate was greater by about 2 times or more than that of the binder composition of Comparative Example 1. It was difficult to form a coating layer from the binder composition of Comparative Example 2 due to phase separation of polymers.

Evaluation Example 3

Heat-Resistance Evaluation

The binder compositions of Example 1 and Comparative Examples 1 and 2 were each coated on a surface of a porous polyethylene substrate having a thickness of about 9 μm (GC0910, available from Toray BSF) to form a coating layer. To evaluate heat-resistance of the coating layer on the porous polyethylene substrate, heat shrinkage ratios of the coating layer at about 130° C. and about 150° C. in traverse direction (TD) and machine direction (MD) were measured using a thermomechanical analyzer (TMA, Q400EM/Q400). The results are shown in Table 2, below.

TABLE 2

| | Heat shrinkage ratio (%) | | | |
| --- | --- | --- | --- | --- |
| | 130° C. | | 150° C. | |
| Example | TD | MD | TD | MD |
| Example 1 | 6 | 12 | 51 | 46 |
| Comparative Example 1 | 7 | 14 | 48 | 45 |
| Comparative Example 2 | — | — | — | — |

Referring to Table 2, the heat shrinkage ratios of the coating layer of the binder composition of Example 1 on the porous polyethylene substrate at about 130° C. and 150° C. in TD and MD directions were similar those of the coating layer of the binder composition of Comparative Example 1 on the porous polyethylene substrate in TD and MD directions. It was difficult to form a coating layer from the binder composition of Comparative Example 2 due to phase separation of polymers.

Evaluation Example 4

Evaluation of Lifetime Characteristics

The lithium batteries of Examples 5 and 6 and Comparative Example 5 were each charged with a constant current of about 0.2 C rate at about 25° C. to a voltage of about 4.2 V, and then with a constant voltage of about 4.2 V to a current of about 0.01 C rate, followed by discharging with a constant current of about 0.5 C to a voltage of about 3.05 V (Formation Process).

Subsequently, each of the lithium batteries after the formation process was charged with a constant current of 0.5 C rate at about 25° C. to a voltage of about 4.2 V, and then with a constant voltage of about 4.2 V to a current of about 0.01 C, followed by discharging with a constant current of about 0.5 C to a voltage of about 3.0 V. This cycle of charging and discharging was repeated 120 times. The results of the charge/discharge test are shown in Table 3, below, and in FIG. 8. Capacity retention rates of the lithium batteries were calculated using Equation 1.

Capacity retention rate[%]=[Discharge capacity at $120^{th}$ cycle/Discharge capacity at $1^{st}$ cycle]×100     Equation 1

TABLE 3

| Example | Discharge capacity at $1^{st}$ cycle (mAh) | Discharge capacity at $120^{th}$ cycle (mAh) | Capacity retention rate (%) |
| --- | --- | --- | --- |
| Example 5 | 3.9017 | 3.1890 | 81.7 |
| Example 6 | 3.9662 | 3.1953 | 80.6 |
| Comparative Example 5 | 3.9923 | 3.1553 | 79.0 |

Figure 8:
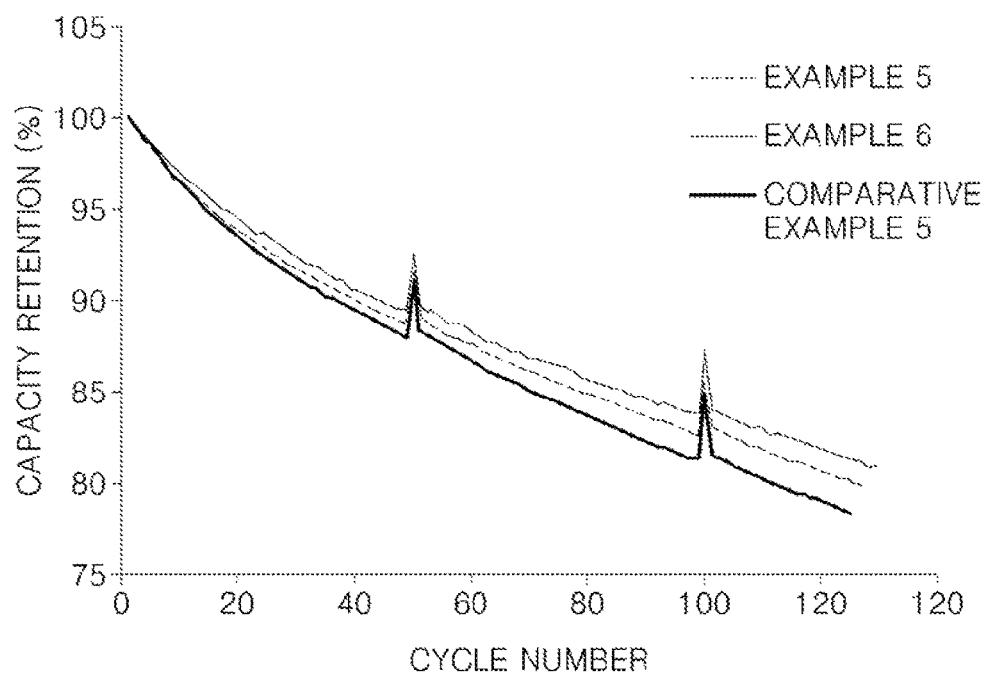
FIG. 8 illustrates a graph illustrating lifetime characteristics of lithium batteries of Examples 5 and 6 and Comparative Example 5.

Referring to Table 3 and FIG. 8, the lithium batteries of Examples 5 and 6 had improved capacity retention rates, compared to the lithium battery of Comparative Example 5, indicating that the lithium batteries of Examples 5 and 6 had improved lifetime characteristics, compared to the lithium battery of Comparative Example 5.

By way of summation and review, characteristics of lithium ion secondary batteries may depend on, e.g., the types of electrodes used, electrolyte solution, and other battery materials. Cycle characteristics of a lithium battery may be determined by a type of a binder that is used in a separator to provide adhesion between a porous substrate and an inorganic oxide, and between adjacent particles of the inorganic oxide. Furthermore, the separator may have a coating layer of an inorganic oxide, e.g., of a ceramic with high heat-resistance. A lithium battery with durability against high voltage and high capacity may be manufactured using the separator with such a coating layer.

A binder for a lithium battery may include a binder prepared using a binder composition of a polyvinylidene fluoride (PVdF)-based polymer in an organic solvent such as N-methyl-2-pyrrolidone (NMP).

When using a polyvinylidene fluoride-based polymer as a binder, an increased amount of the binder may be required to obtain satisfactory adhesion between the porous substrate and particles of the inorganic oxide. Moreover, a coating layer formed on the substrate of the separator may not remain stable against permeation of the electrolyte solution and migration of lithium ions during charging and discharging of the lithium battery.

A binder composition that helps improve adhesions between a porous substrate and an inorganic oxide, and between adjacent particles of the inorganic oxide of a separator to improve lifetime characteristics of a lithium battery including the separator may be desirable.

The embodiments may provide a binder composition with improved adhesion between a porous substrate and an inorganic oxide, and between adjacent particles of the inorganic oxide.

The embodiments may provide a lithium battery with improved lifetime characteristics that includes the separator.

As described above, according to an embodiment, a binder composition prepared via graft polymerization may help improve adhesions between a porous substrate and an inorganic oxide, between adjacent particles of the inorganic oxide of a separator. Using a separator including a binder formed from the binder composition, a lithium battery may have improved lifetime characteristics.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

EXPLANATION OF REFERENCE NUMERALS 1, 11: porous substrate, 2: inorganic oxide, 3: binder, 22: coating layer, 23: 3M tape,
100: lithium secondary battery, 112: cathode, 10, 113: separator, 114: anode,
120: battery case, 140: sealing member

What is claimed is:

1. A separator for a battery, the separator comprising:
a porous substrate;
a coating layer on at least one surface of the porous substrate, the coating layer including an inorganic oxide; and
a binder between the porous substrate and the inorganic oxide or between adjacent particles of the inorganic oxide, the binder including a graft copolymer, wherein:
the graft copolymer has:
a backbone of a polyvinylidene fluoride-based polymer or a polyvinylidene fluoride-based copolymer, and
a pendant chain grafted to the backbone, the pendant chain including a hydrophilic repeating unit, and
fluorine atoms in the backbone of the graft copolymer are partially substituted with at least one of chlorine, bromine, or iodine.

2. The separator as claimed in claim 1, wherein an amount of the fluorine atoms partially substituted with the at least one of chlorine, bromine, or iodine is about 1 wt % to about 10 wt %, based on a total weight of fluorine atoms in the backbone.

3. The separator as claimed in claim 1, wherein the backbone includes polyvinylidene fluoride-co-chlorotrifluoroethylene or polyvinylidene fluoride-co-chlorotrifluoroethylene/polyvinylidene fluoride-co-hexafluoropropylene.

4. The separator as claimed in claim 1, wherein the pendant chain has a weight average molecular weight of from about 100 g/mol to about 1,000,000 g/mol.

5. The separator as claimed in claim 1, wherein the pendant chain includes a carboxyl group in the hydrophilic repeating unit.

6. The separator as claimed in claim 1, wherein the hydrophilic repeating unit is derived from a vinyl-based monomer.

7. The separator as claimed in claim 6, wherein the vinyl-based monomer includes at least one of acrylic acid, butyl acrylate, triethylene glycol acrylate, acrylonitrile, acrylamide, 2-hydroxyethyl acrylate, maleic anhydride, ethylene glycol vinyl ether, or itaconic acid.

8. The separator as claimed in claim 1, wherein the graft copolymer is included in the binder in an amount of about 0.1 wt % to about 100 wt %, based on a total weight of the binder.

9. The separator as claimed in claim 1, wherein the inorganic oxide includes at least one selected from $\alpha\text{-}Al_2O_3$, $\gamma\text{-}Al(O)OH$, $TiO_2$, $ZrO_2$, and $SiO_2$.

10. The separator as claimed in claim 1, wherein the binder is included in the separator in an amount of about 1 wt % to about 50 wt %, based on a total weight of the inorganic oxide.

11. The separator as claimed in claim 1, wherein the porous substrate is a polyolefin-based porous substrate.

12. The separator as claimed in claim 1, wherein the binder has an adhesive strength of about 40 mN/mm or greater with respect to the porous substrate.

13. A battery, comprising:
a cathode;
an anode; and
a separator between the cathode and the anode, the separator being the separator as claimed in claim 1.

* * * * *